No. 897,213. PATENTED AUG. 25, 1908.
F. J. LEWIS.
DISK CULTIVATOR.
APPLICATION FILED MAR. 28, 1908.
2 SHEETS—SHEET 1.
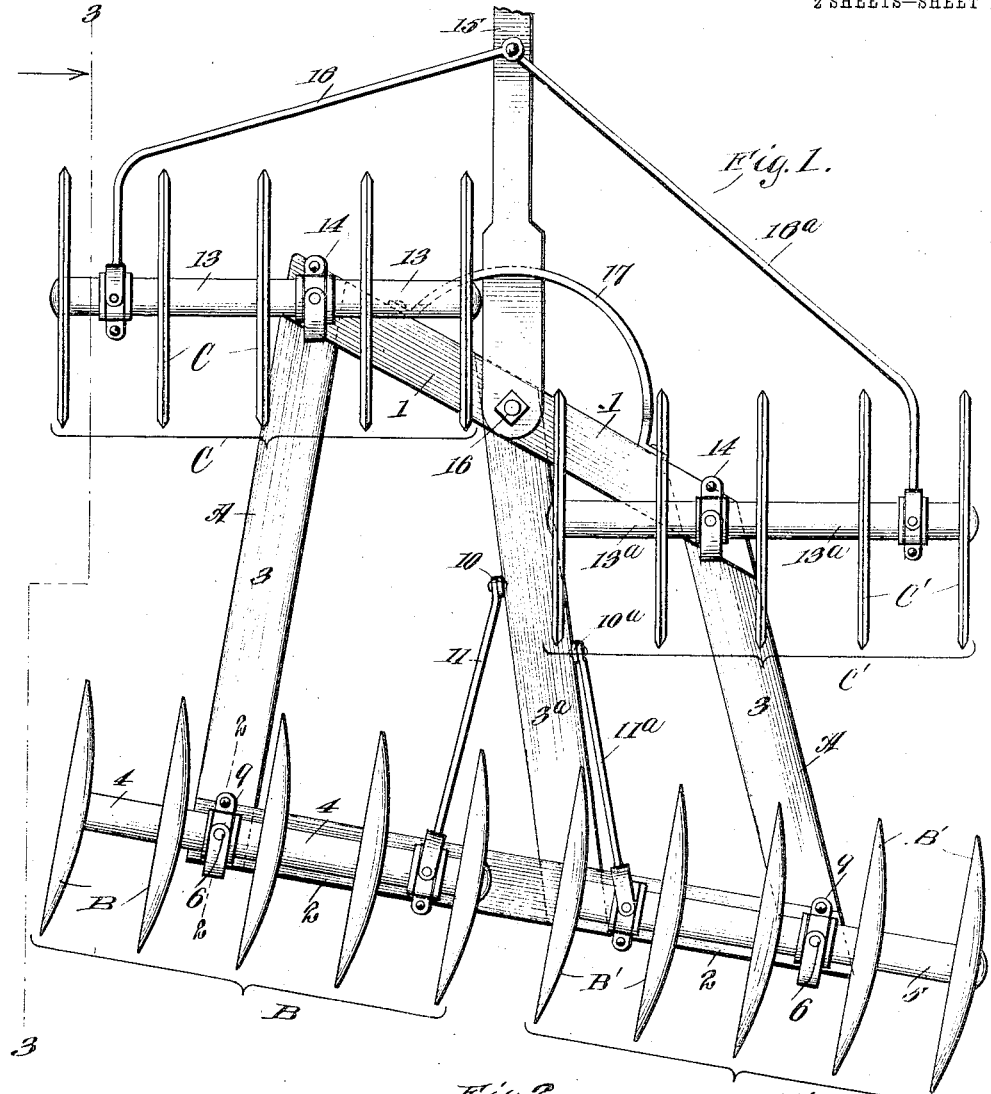
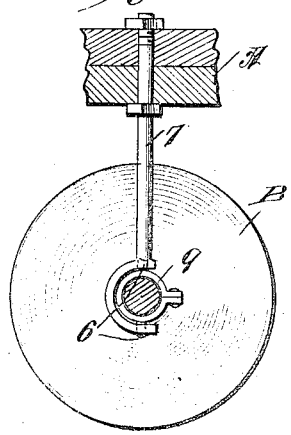
WITNESSES
E. M. Callaghan
INVENTOR
FRANK J. LEWIS
BY Munn & Co.
ATTORNEYS No. 897,213. PATENTED AUG. 25, 1908.
F. J. LEWIS.
DISK CULTIVATOR.
APPLICATION FILED MAR. 28, 1908.
2 SHEETS—SHEET 2.
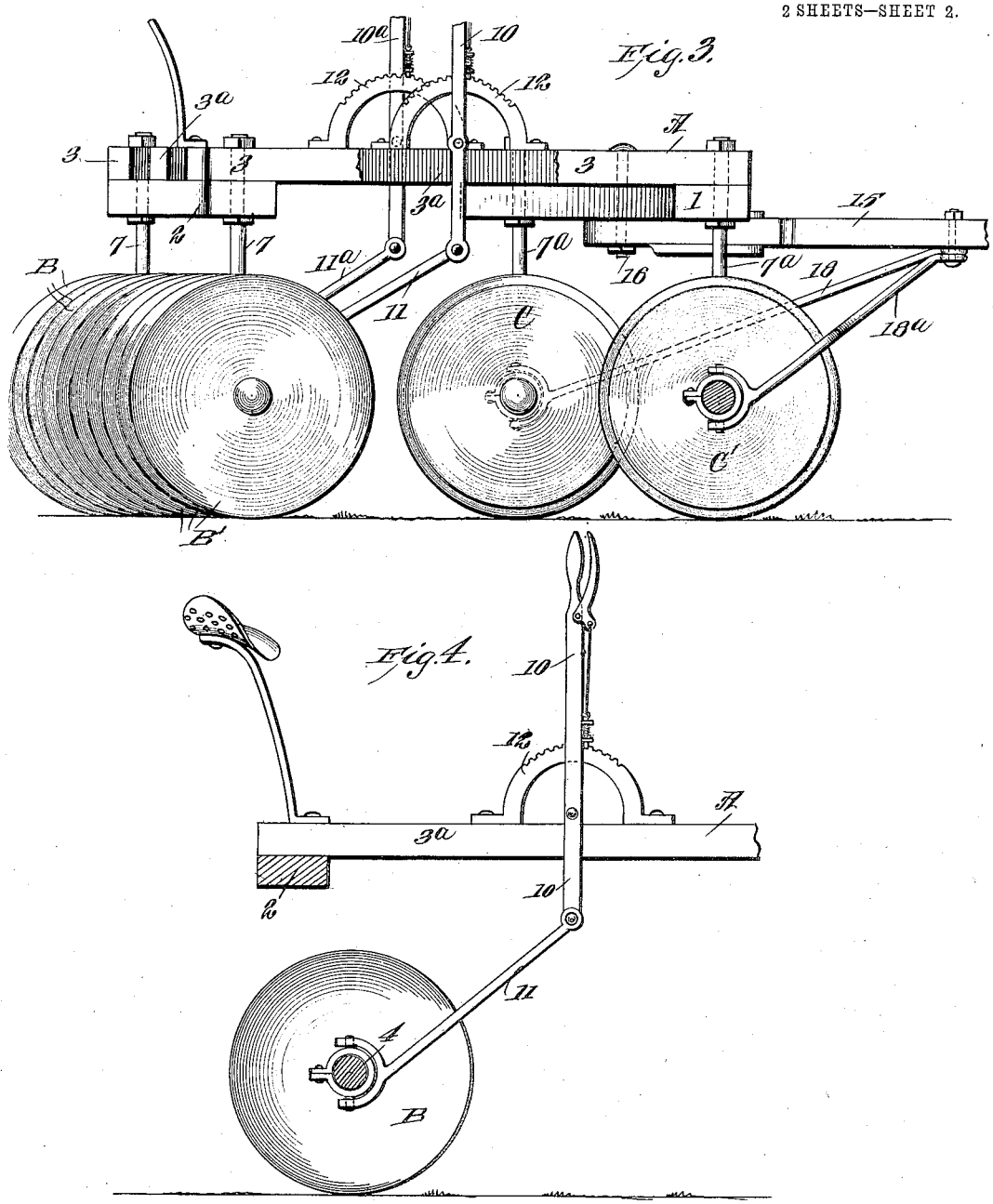
WITNESSES
E. M. Callaghan
Amos W. Hart
INVENTOR
FRANK J. LEWIS
BY Munn & Co.
ATTORNEYS

UNITED STATES PATENT OFFICE.

FRANK J. LEWIS, OF GUADALOUPE, CALIFORNIA.

DISK CULTIVATOR.

No. 897,213.  Specification of Letters Patent.  Patented Aug. 25, 1908.

Application filed March 28, 1908. Serial No. 423,839.

*To all whom it may concern:*

Be it known that I, FRANK J. LEWIS, a citizen of the United States, and a resident of Guadaloupe, in the county of Santa Barbara and State of California, have invented certain new and useful Improvements in Disk Cultivators, of which the following is a specification.

In disk harrows and cultivators there is necessarily more or less side draft which must be resisted or compensated for. I have devised an improved cultivator of this type in which two series of flat disks are arranged in front of the concave disks and serve to resist the side draft of the latter while acting also as circular colters by which the soil is sliced vertically in parallel rows. The concave or soil-cutting disks are arranged, like the colters that precede them, in two series, and on separate horizontal axles, or shafts, which are pivoted and adapted to swing horizontally in order that the disks may be set at different inclinations to the line of travel of the cultivator as a whole, and thus caused to take or dislodge more or less soil.

The invention is embodied in the construction, arrangement, and combination of parts hereinafter described, and shown in the accompanying drawings in which Figure 1 is an inverted plan view of the cultivator. Fig. 2 is a vertical section on the line 2—2 of Fig. 1. Fig. 3 is a vertical section on the line 3—3 of Fig. 1, the frame of the cultivator being shown broken out in the middle portion in order to illustrate the position and relation of a lever. Fig. 4 is a vertical longitudinal section of the rear portion of the cultivator.

The frame A of the cultivator is preferably constructed of a front bar 1, a rear bar 2, and a series of connecting longitudinal bars 3, 3ª. The bars 1 and 2 are inclined with relation to the connecting bars 3, 3ª. There are two sets of concave cutting disks B, B', and two corresponding sets C, C', of plane or flat colter disks. The concave cutting disks B are mounted rotatably upon an axle 4, and the disks B' are similarly mounted on an axle 5. The axles 4, 5, are pivoted at 6 in supports 7 consisting of metal bars or rods which extend up through the rear corners of the frame A and are secured by nuts, as shown in Fig. 2. The construction whereby these supports or posts 7 are connected with the axles B, B', may be varied, but, as shown in Fig. 2, a collar 9 is clamped on the axle and provided with trunnions which are in vertical alinement and the lower end of the supports or posts 7 is semicircular and provided with sockets adapted to receive the said trunnions. I thus form a detachable connection between the disks and the posts and at the same time a secure one which permits the axles to oscillate in a horizontal plane. The position or angle at which the axles 4, 5, may be set relative to the frame and to each other, and therefore the angle of the cutting disks B, B', to the line of travel of the cultivator, may be varied at will, and for this purpose I employ levers 10, 10ª, and links 11, 11ª—see Figs. 3 and 4. The links are jointed with the inner ends of the axles 4 and 5 and with the lower ends of the levers 10, 10ª, which are pivoted on the frame and provided with means for locking them to toothed segments 12, as will be readily understood from the drawing. When the cutting disks B, B', are set in the working position, the axles 4 and 5 are in alinement as shown in Fig. 1; but it is apparent that they may be set at different angles to each other and to the line of travel of the cultivator.

The plane, or flat, colter disks C, C', are mounted on axles 13, 13ª, which are pivoted at 14 in vertical posts or supports 7ª similarly to the posts 7 before described. The pivotal points 14 are at the front corners of the frame A, in the same manner as the pivotal points of the rear axles 4 and 5, are at the rear corners of the frame.

The pole or tongue 15 to which horses or other draft animals are in practice attached, is pivoted at 16 to the front bar 2 of the frame A, and is suitably supported by a half circle 17, or by other means which may be preferred. The tongue is connected by rods 18, 18ª, with the outer ends of the front axles 13, 13ª. The connection may be effected in various ways, it being only necessary that the axles shall be free to revolve and that the rods 18, 18ª, shall not come in contact with the disks C, C'. The form of joint or connection is indicated in Fig. 3, the rear ends of the rods 18, 18ª, being forked or semicircular, and attached to a trunnioned collar clamped on either axle.

It is apparent that if the team be driven straight ahead, the colter disks C, C', will be held and travel in planes parallel to such direction; but if the team be driven right or left, the tongue 15 will assume a greater or less angle to the frame, and thereby the angle of the colter disks to the frame will be changed correspondingly. The disks C, C', are thus adapted not only to support the front end of the frame, and to cut the soil or sward in advance of the cutting disks or cultivating implements proper B, B'; but the most important function of the colter disks C, C', is, however, to prevent, or compensate for, the side draft due to the action of the concave disks B, B'. It is obvious that this side draft will increase with the inclination of the cutting disks, or in other words it will be greater when a wide slice of soil is taken by the concave disks than when a narrow one is taken.

What I claim is:

A disk cultivator comprising a frame, axles pivoted beneath the frame and adapted to swing horizontally so that they may be placed at different inclinations to the line of travel of the cultivator, concave cutting disks mounted on said axles, means for adjusting the angle of the axles, and two forward axles also pivoted and adapted to swing horizontally, and plane or flat disks mounted on said axles and adapted to serve as colters, a tongue pivoted to the front of the frame, and means connecting the same with the colter axles for shifting the inclination of the latter corresponding with the angle of the tongue to the frame, substantially as described.

FRANK J. LEWIS.

Witnesses:
 FERDINAND LEWIS,
 Mrs. A. B. McREYNOLDS